(12) United States Patent
Levy et al.

(10) Patent No.: US 7,759,031 B2
(45) Date of Patent: Jul. 20, 2010

(54) PHOTOCONDUCTORS CONTAINING FLUOROGALLIUM PHTHALOCYANINES

(75) Inventors: Daniel V. Levy, Rochester, NY (US); Liang-Bih Lin, Rochester, NY (US); Jin Wu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 650 days.

(21) Appl. No.: 11/807,028

(22) Filed: May 24, 2007

(65) Prior Publication Data

US 2008/0292982 A1 Nov. 27, 2008

(51) Int. Cl.
*G03G 5/047* (2006.01)
(52) U.S. Cl. .................. 430/58.8; 430/59.4; 430/78; 540/140
(58) Field of Classification Search ............... 430/59.4, 430/58.8, 58.75, 970, 78; 540/140
See application file for complete search history.

(56) References Cited

U.S. PATENT DOCUMENTS

| | | | |
|---|---|---|---|
| 4,265,990 A | | 5/1981 | Stolka et al. |
| 4,555,463 A | | 11/1985 | Hor et al. |
| 4,587,189 A | | 5/1986 | Hor et al. |
| 5,312,706 A | * | 5/1994 | Springett ................. 430/59.4 |
| 5,473,064 A | | 12/1995 | Mayo et al. |
| 5,482,811 A | | 1/1996 | Keoshkerian et al. |
| 5,521,306 A | | 5/1996 | Burt et al. |
| 6,245,472 B1 | | 6/2001 | Tanaka |
| 6,913,863 B2 | | 7/2005 | Wu et al. |
| 2004/0126685 A1 | * | 7/2004 | Horgan et al. ............ 430/58.75 |

OTHER PUBLICATIONS

Klofta, et al., University of Arizona, Tucson. "Tri- and Tetravalent Phthalocyanine Thin Film Photoelectrodes: Comparison with Other Metal and Demetallated Phthalocyanine Systems", Journal of the Electrochemical Society (1985) vol. 132, No. 9, pp. 2134-2144.*
Aroca et al., "Vibrational Studies of Molecular Organization in Evaporated Phthalocyanine Thin Solid Films", Chemistry of Materials (1995), vol. 7, No. 1, pp. 69-74.*
Schletywein et al. "Light-induced dioxygen reduction at thin film electrodes of various porphyrins" Journal of Physical Chemistry (1991), vol. 95, No. 4, pp. 1748-1755.*
Jin Wu et al., U.S. Appl. No. 11/593,658 on Photoconductors Containing Halogenated Binders, filed Nov. 7, 2006.

* cited by examiner

*Primary Examiner*—Christopher RoDee
(74) *Attorney, Agent, or Firm*—E. O. Palazzo

(57) ABSTRACT

A photoconductor comprising an optional supporting substrate, a fluorogallium phthalocyanine containing photogenerating layer, and at least one charge transport layer.

11 Claims, 2 Drawing Sheets

PHOTOCONDUCTORS CONTAINING FLUOROGALLIUM PHTHALOCYANINES

BACKGROUND

This disclosure is generally directed to photoconductors, and the like. More specifically, the present disclosure is directed to rigid or multilayered flexible, belt photoconductors, or devices comprised of an optional supporting medium like a substrate, an optional undercoat, or a hole blocking layer usually situated between the substrate and the photogenerating layer; a fluorogallium phthalocyanine containing photogenerating layer, and at least one charge transport layer wherein at least one is from 1 to about 5, from 1 to about 3, 2, 1, and the like, such as a first charge transport layer and a second charge transport layer; an optional adhesive layer, and an optional overcoating layer, and wherein at least one of the charge transport layers contains at least one charge transport component, and a polymer or resin binder, and where, in embodiments, the resin binder selected for the undercoat layer is a known suitable binder including a binder that is substantially insoluble in a number of solvents like methylene chloride, examples of these binders being illustrated in copending application Ser. No. 11/593,658, filed Nov. 7, 2006, the disclosure of which is totally incorporated herein by reference. Also, when present the hole blocking layer can contain in embodiments phenol resins, known hole blocking layer polymers as illustrated in U.S. Pat. No. 6,913,863, the disclosure of which is totally incorporated herein by reference, which discloses a hole blocking layer, a photogenerating layer, and a charge transport layer, and wherein the hole blocking layer is comprised of a metal oxide; and a mixture of a phenolic compound and a phenolic resin wherein the phenolic compound contains at least two phenolic groups, or chlorinated polymeric resins as the binder, and a hydrolyzed aminosilane as the electroconducting species since it is believed that the $CH_2Cl_2$ insoluble binders prevent or minimize the migration of hole transport molecules from the upper charge transport layer into lower layers, and then into the undercoat or ground plane layer. Examples of chlorinated homopolymers include polyvinylidene chloride, chlorinated polyvinyl chloride, and chlorinated polyvinylidene chloride. Examples of chlorinated copolymers include copolymers of vinylidene chloride, chlorinated vinyl chloride, and chlorinated vinylidene chloride with vinylidene fluoride, tetrafluoroethylene, trifluorochloroethylene, hexafluoropropylene, and the like.

In embodiments, there are disclosed photoconductors with excellent photosensitivity, such as with $E_{1/2}$ values (amount of energy required to discharge half the surface potential on the photoconductor) of from about 2.5 to about 9 ergs/cm$^2$, and more specifically, from about 2.9 to about 8.5 ergs/cm$^2$.

A number of advantages are associated with the disclosed photoconductors in addition to their excellent photosensitivity, and for example, the formation of minimal dark decay characteristics, which dark decay can result in undesirable decreased photoconductor operating life, and consequently resulting in increased cost of maintenance, and where the dark decay can result from charge leakage from the photogenerating layer, charge transport layer or layers, undercoat layer or intermediate layers; minimization or prevention of charge leakages from the photogenerating layer to charge transport layer or layers, or from the photogenerating layer to any other layer in the photoconductor, such as the undercoating layer or intermediate, and more specifically, from the photogenerating layer to any upper and lower layers of the photoconductor permitting less undesirable dark decay and extending operating life; and developed images of high resolution.

Also included within the scope of the present disclosure are methods of imaging and printing with the photoconductors illustrated herein. These methods generally involve the formation of an electrostatic latent image on the photoconductor or imaging member, followed by developing the image with a toner composition comprised, for example, of thermoplastic resin, colorant, such as pigment, charge additive, and surface additive, reference U.S. Pat. Nos. 4,560,635; 4,298,697 and 4,338,390, the disclosures of which are totally incorporated herein by reference, subsequently transferring the image to a suitable substrate, and permanently affixing the image thereto. In those environments wherein the photoconductor is to be used in a printing mode, the imaging method involves the same operation with the exception that exposure can be accomplished with a laser device or image bar. More specifically, the flexible photoconductor belts disclosed herein can be selected for the Xerox Corporation iGEN® machines that generate with some versions over 100 copies per minute. Processes of imaging, especially xerographic imaging and printing, including digital, and/or color printing, are thus encompassed by the present disclosure.

REFERENCES

In U.S. Pat. No. 6,245,472 there are recited processes for the preparation of the novel phthalocyanines of zirconium phthalocyanine, bromogallium phthalocyanine, and iodogallium phthalocyanine and photoconductors thereof. One process embodiment disclosed in this patent involves the reaction of phthalonitrile and gallium triiodide in a reaction solvent, followed by washing.

There is illustrated in U.S. Pat. No. 6,913,863, the disclosure of which is totally incorporated herein by reference, a photoconductive imaging member comprised of a hole blocking layer, a photogenerating layer, and a charge transport layer, and wherein the hole blocking layer is comprised of a metal oxide; and a mixture of a phenolic compound and a phenolic resin wherein the phenolic compound contains at least two phenolic groups.

Layered photoconductors have been described in a number of U.S. patents, such as U.S. Pat. No. 4,265,990, the disclosure of which is totally incorporated herein by reference. Further, in U.S. Patent 4,555,463, the disclosure of which is totally incorporated herein by reference, there is illustrated a layered imaging member with a chloroindium phthalocyanine photogenerating layer. In U.S. Pat. No. 4,587,189, the disclosure of which is totally incorporated herein by reference, there is illustrated a layered imaging member with, for example, a perylene, pigment photogenerating component. Both of the aforementioned patents disclose an aryl amine component, such as N,N'-diphenyl-N,N'-bis(3-methylphenyl)-1,1'-biphenyl-4,4'-diamine dispersed in a polycarbonate binder as a hole transport layer.

In U.S. Pat. No. 4,921,769, the disclosure of which is totally incorporated herein by reference, there are illustrated photoconductive imaging members with blocking layers of certain polyurethanes.

Illustrated in U.S. Pat. No. 5,521,306, the disclosure of which is totally incorporated herein by reference, is a process for the preparation of Type V hydroxygallium phthalocyanine comprising the in situ formation of an alkoxy-bridged gallium phthalocyanine dimer, hydrolyzing the dimer to hydroxygallium phthalocyanine, and subsequently converting the hydroxygallium phthalocyanine product to Type V hydroxygallium phthalocyanine.

Illustrated in U.S. Pat. No. 5,482,811, the disclosure of which is totally incorporated herein by reference, is a process for the preparation of hydroxygallium phthalocyanine photogenerating pigments, which comprises hydrolyzing a gallium phthalocyanine precursor pigment by dissolving the hydroxygallium phthalocyanine in a strong acid, and then reprecipitating the resulting dissolved pigment in basic aqueous media; removing any ionic species formed by washing with water, concentrating the resulting aqueous slurry comprised of water and hydroxygallium phthalocyanine to a wet cake; removing water from said slurry by azeotropic distillation with an organic solvent, and subjecting said resulting pigment slurry to mixing with the addition of a second solvent to cause the formation of said hydroxygallium phthalocyanine polymorphs.

Also, in U.S. Pat. No. 5,473,064, the disclosure of which is totally incorporated herein by reference, there is illustrated a process for the preparation of photogenerating pigments of hydroxygallium phthalocyanine Type V essentially free of chlorine, whereby a pigment precursor Type I chlorogallium phthalocyanine is prepared by reaction of gallium chloride in a solvent, such as N-methylpyrrolidone, present in an amount of from about 10 parts to about 100 parts, and preferably about 19 parts with 1,3-diiminoisoindolene ($DI^3$) in an amount of from about 1 part to about 10 parts, and preferably about 4 parts of $DI^3$, for each part of gallium chloride that is reacted; hydrolyzing the pigment precursor chlorogallium phthalocyanine Type I by standard methods, for example acid pasting, whereby the pigment precursor is dissolved in concentrated sulfuric acid and then reprecipitated in a solvent, such as water, or a dilute ammonia solution, for example from about 10 to about 15 percent; and subsequently treating the resulting hydrolyzed pigment hydroxygallium phthalocyanine Type I with a solvent, such as N,N-dimethylformamide, present in an amount of from about 1 volume part to about 50 volume parts, and preferably about 15 volume parts for each weight part of pigment hydroxygallium phthalocyanine that is used by, for example, ball milling the Type I hydroxygallium phthalocyanine pigment in the presence of spherical glass beads, approximately 1 millimeter to 5 millimeters in diameter, at room temperature, about 25° C., for a period of from about 12 hours to about 1 week, and preferably about 24 hours.

SUMMARY

Disclosed are photoconductive members with many of the advantages illustrated herein, such as high photosensitivity, the minimal generation of charge deficient spots, extended lifetimes of service of, for example, about 2,500,000 imaging cycles; excellent electronic characteristics; stable electrical properties; low image ghosting; resistance to charge transport layer cracking upon exposure to the vapor of certain solvents; consistent $V_r$ (residual potential) that is substantially flat or no change over a number of imaging cycles as illustrated by the generation of known PIDC (Photo-Induced Discharge Curve), and the like.

Further, disclosed are layered flexible photoconductive imaging members with sensitivity to visible light.

Moreover, disclosed are layered belt photoresponsive or photoconductive imaging members with mechanically robust and solvent resistant charge transport layers.

EMBODIMENTS

Figure 1:
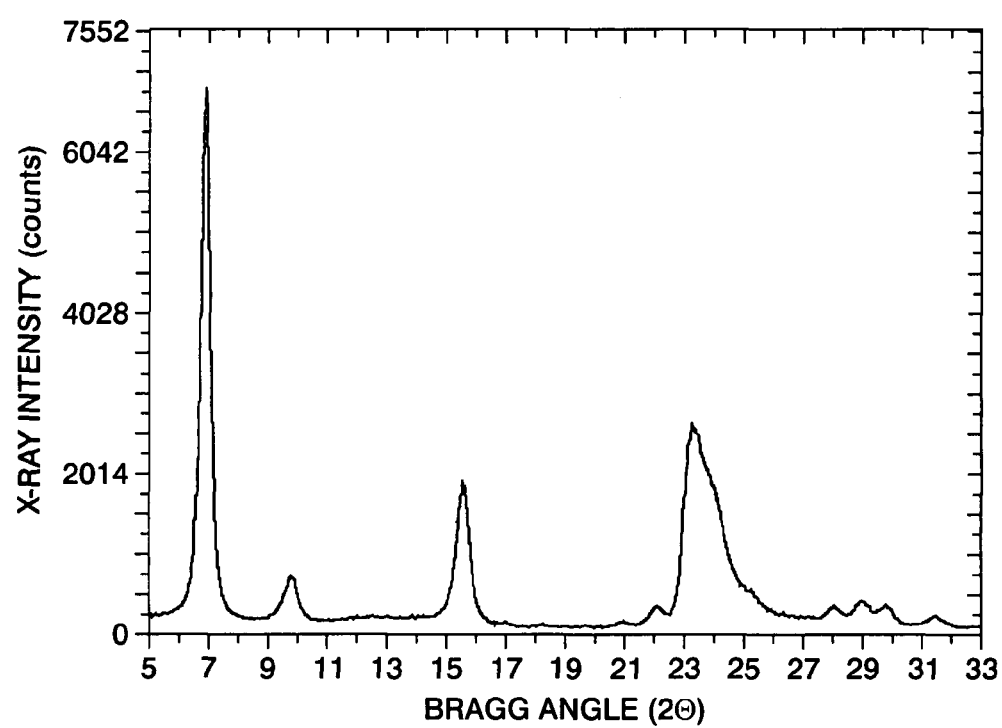
FIG. 1 illustrates an x-ray diffraction spectrum of fluorogallium phthalocyanine.

Aspects of the present disclosure relate to an imaging member comprising an optional supporting substrate, a photogenerating layer comprised of a fluorogallium phthalocyanine photogenerating pigment optionally dispersed in a resin or polymer binder, and at least one charge transport layer, such as from 1 to about 7 layers, from 1 to about 5 layers, from 1 to about 3 layers, 2 layers, or 1 layer; a flexible photoconductor comprising in sequence a substrate, a photogenerating layer containing a fluorogallium phthalocyanine pigment, which pigment can be prepared by the reaction of a hydroxygallium phthalocyanine with hydrofluoric acid, and at least one charge transport layer comprised of at least one charge transport component comprised of hole transport molecules and a resin binder, and an optional hole blocking layer comprised, for example, of an aminosilane and a halogenated, such as a chlorinated, polymeric resin that is insoluble or substantially insoluble in methylene chloride, and a number of other similar solvents; a photoconductive member with a photogenerating layer of a thickness of from about 0.1 to about 10 microns, and at least one charge transport layer, each of a thickness of from about 5 to about 100 microns; an imaging method and an imaging apparatus containing a charging component, a development component, a transfer component, and a fixing component, and wherein the apparatus contains a photoconductive imaging member comprised of a supporting substrate, a fluorogallium phthalocyanine photogenerating layer pigment, and which pigment is dispersed in a polymeric binder, and a charge transport layer or layers, and thereover an overcoating charge transport layer, and where the transport layer is of a thickness of from about 40 to about 75 microns; a member wherein the photogenerating layer contains a binder like a polycarbonate, and dispersed therein a fluorogallium phthalocyanine pigment present in an amount of from about 5 to about 95 weight percent; a member wherein the thickness of the photogenerating layer is from about 0.1 to about 4 microns; a member wherein hole blocking layer polymer binder is present in an amount of from about 0.1 to about 90, from 1 to about 50, from 2 to about 25, and from 5 to about 10 percent by weight, and wherein the total of all blocking layer components is about 100 percent; a photoconductor wherein the supporting substrate is comprised of a conductive substrate comprised of a metal; a photoconductor wherein the conductive substrate is aluminum, aluminized polyethylene terephthalate or titanized polyethylene terephthalate; a photoconductor wherein the photogenerating layer can in embodiments contain a second photogenerating pigment like a titanyl phthalocyanine, a hydroxygallium phthalocyanine, or generally a suitable metal or metal free phthalocyanine; a photoconductor wherein each of the charge transport layers comprises

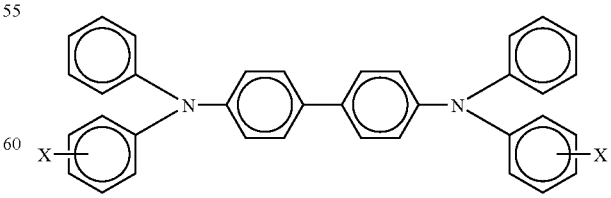

wherein X is selected from the group consisting of a suitable hydrocarbon like alkyl, alkoxy, aryl, and substituted deriva tives thereof, halogen and mixtures thereof, or wherein X can be included on the four terminating rings

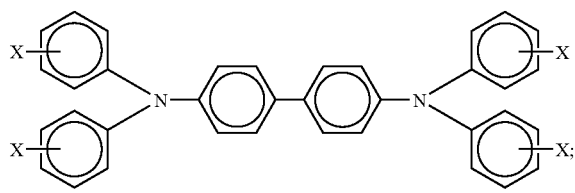

a photoconductor wherein alkyl and alkoxy contains from about 1 to about 12 carbon atoms; a photoconductor member wherein alkyl contains from about 1 to about 5 carbon atoms; a photoconductor wherein alkyl is methyl; a photoconductor wherein each of or at least one of the charge transport layers comprises

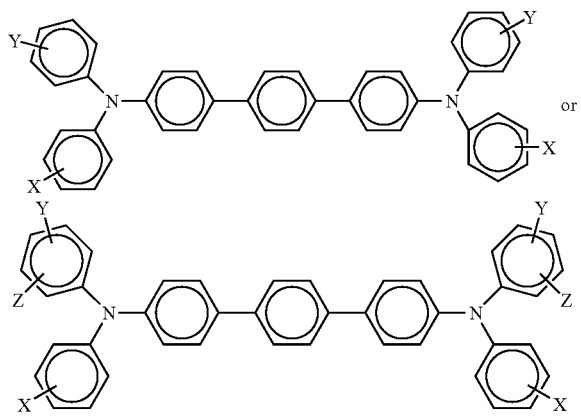

or wherein X, Y and Z are independently alkyl, alkoxy, aryl, a halogen, or mixtures thereof; a photoconductor wherein for the above terphenyl amine alkyl and alkoxy each contains from about 1 to about 12 carbon atoms; an imaging member wherein alkyl contains from about 1 to about 5 carbon atoms; a method of imaging which comprises generating an electrostatic latent image on the photoconductors disclosed herein, developing the latent image, and transferring the developed electrostatic image to a suitable substrate, and wherein the photoconductor is exposed to light of a wavelength of from about 370 to about 950 nanometers; a photoconductor wherein the photogenerating layer is situated between the substrate and the charge transport; a member wherein the charge transport layer is situated between the substrate and the photogenerating layer; a member wherein the photogenerating layer is of a thickness of from about 0.1 to about 50 microns; a member wherein the photogenerating component amount is from about 0.05 weight percent to about 95 weight percent, and wherein the photogenerating pigment is dispersed in from about 96 weight percent to about 5 weight percent of polymer binder, such as a binder as illustrated herein with regard to the binder selected for the charge transport layer, and more specifically, a polycarbonate, and where the hole blocking layer contains a chlorinated polymer binder; a member wherein the thickness of the photogenerating layer is from about 0.2 to about 12 microns; a photoconductor wherein the charge transport layer resinous binder is selected from the group consisting of polyesters, polyvinyl butyrals, polycarbonates, polyarylates, copolymers of polycarbonates and polysiloxanes, polystyrene-b-polyvinyl pyridine, and polyvinyl formals; a photoconductor wherein the photogenerating component is a fluorogallium phthalocyanine, and which layer optionally includes another pigment like Type V hydroxygallium phthalocyanine, titanyl phthalocyanine, or chlorogallium phthalocyanine, and the charge transport layer contains a hole transport of N,N'-diphenyl-N, N-bis(3-methylphenyl)-1,1'-biphenyl-4,4'-diamine, N,N'-bis(4-butylphenyl)-N,N'-di-p-tolyl-[p-terphenyl]-4,4"-diamine, N,N'-bis(4-butylphenyl)-N,N'-di-m-tolyl-[p-terphenyl]-4, 4"-diamine, N,N'-bis(4-butylphenyl)-N,N'-di-o-tolyl-[p-terphenyl]-4,4"-diamine, N,N'-bis(4-butylphenyl)-N,N'-bis-(4-isopropylphenyl)-[p-terphenyl]-4,4"-diamine, N,N'-bis(4-butylphenyl)-N,N'-bis-(2-ethyl-6-methylphenyl)-[p-terphenyl]-4,4"-diamine, N,N'-bis(4-butylphenyl)-N,N'-bis-(2,5-dimethylphenyl)-[p-terphenyl]-4,4"-diamine, N,N'-diphenyl-N,N'-bis(3-chlorophenyl)-[p-terphenyl]-4,4"-diamine molecules; a photoconductive imaging member with an aminosilane and chlorinated polymer containing a blocking layer contained as a coating on a substrate, and an adhesive layer coated on the blocking layer; a color method of imaging which comprises generating an electrostatic latent image on the imaging member, developing the latent image, transferring, and fixing the developed electrostatic image to a suitable substrate; photoconductive imaging members comprised of a supporting substrate, a hole blocking or undercoat layer as illustrated herein, a photogenerating layer, a hole transport layer, and a top overcoating layer in contact with the hole transport layer, or in embodiments, in contact with the photogenerating layer, and in embodiments wherein a plurality of charge transport layers are selected, such as for example, from 2 to about 10, and more specifically, 2 may be selected; and a photoconductive imaging member comprised in sequence of a supporting substrate, a hole blocking layer; a photogenerating layer comprised of a fluorogallium phthalocyanine photogenerating pigment, and a first, second, or third charge transport layer; and a photoconductor comprising in sequence a substrate, a hole blocking or undercoat layer, a fluorogallium phthalocyanine photogenerating layer, and a charge transport layer comprised of at least one charge transport component, and a resin binder; a flexible photoconductor comprising in sequence a supporting substrate layer, a photogenerating layer, and a charge transport layer, and wherein the photogenerating layer includes a fluorogallium phthalocyanine in an amount of from about 75 to about 100 weight percent; fluorogallium phthalocyanine; a process for the preparation of the fluorogallium phthalocyanine comprising the reaction of a hydroxygallium phthalocyanine and hydrofluoric acid; a process wherein the reaction is accomplished at a temperature of from about 100° C. to about 250° C., and the hydroxygallium phthalocyanine is Type I hydroxygallium phthalocyanine; a process wherein after cooling the fluorogallium phthalocyanine is mixed with a suitable solvent; a process wherein the solvent is at least one of dimethylformamide, butyl acetate, monochlorobenzene, deionized water, methanol, and acetone; a process wherein the amount of solvent selected is from about 50 milliliters to about 500 milliliters, and where there results a fluorogallium phthalocyanine of high purity; a process wherein the fluorogallium phthalocyanine product possesses XRPD major peaks at 6.9, 23.3, and 15.5 degrees, and IR spectra major peaks at 721, 1,122, and 1,335 cm$^{-1}$; a photoconductor wherein the fluorogallium phthalocyanine product possesses XRPD major peaks at 6.9, 23.3, and 15.5 degrees, and IR spectra major peaks at 721, 1,122, and 1,335 cm$^{-1}$.

The fluorogallium phthalocyanine can be prepared by the reaction of a hydroxygallium phthalocyanine, such as, for example, Type I hydroxygallium phthalocyanine and hydrofluoric acid in the presence of heat, followed by cooling, then washing and drying. More specifically, the fluorogallium phthalocyanine can be prepared by the mixing and reaction of hydrofluoric acid, or a suitable source of fluorine and a hydroxygallium phthalocyanine, which reaction is accomplished at elevated temperatures of from about 75° C. to about 225° C., and more specifically, from 100° C. to 175° C., and where about 40 to about 60 weight percent of the hydroxygallium phthalocyanine is selected, and from about 60 to about 40 weight percent of the hydrofluoric acid is selected. Subsequent to repeated washings with, for example, deionized water, an alcohol like methanol, and a ketone like acetone, and then drying overnight, from about 18 to about 20 hours at a suitable temperature of, for example, from about 50° C. to about 70° C., and more specifically, about 60° C. the product resulting, which in embodiments has a purple color, was identified as fluorogallium phthalocyanine by x-ray diffraction and infrared spectroscopy.

The washed and vacuum dried product can then be subjected to a conversion to a different crystal form by mixing this product with a suitable series of solvents, such as at least one of dimethylformamide (DMF), n-butyl acetate (NBA), monochlorobenzene (MCB), deionized water, methanol, tetrahydrofuran (THF), and acetonitrile. More specifically, the fluorogallium phthalocyanine product obtained can be placed in an amber glass jar along with 6 millimeter glass beads, and for example, about 20 grams of the conversion solvent monochlorobenzene, followed by mixing in, for example, a roll mill with a speed of about 60 rpm for a suitable time, such as two days. Thereafter, the fluorogallium phthalocyanine product can be collected by filtration through a fritted vacuum funnel, and then washed with a suitable solvent like acetone, followed by drying in a vacuum oven for about 18 to about 20 hours, or overnight. In embodiments, examples of conversion solvents are halogen-containing solvents, such as chloroform, chlorobenzene and dichlorobenzene; ketone solvents, such as cyclohexanone, methyl ethyl ketone, and acetone; nitrile solvents, such as acetonitrile and benzonitrile; ester solvents, such as ethyl acetate and butyl acetate; alcohol solvents, such as methanol, ethanol, propanol, ethylene glycol, and polyethylene glycol; and ether solvents, such as tetrahydrofuran, 1,4-dioxane, propyl ether, and butyl ether in an amide solvent, such as N,N-dimethylformamide, or N-methylpyrrolidone, and other suitable solvents like pentane, hexane, cyclohexane benzene, toluene, xylene, and the like. Solvent amounts selected can vary, however, generally the amount of solvent is, for example, from about 1 to about 50, from 1 to about 20, and more specifically, from about 2 to about 6 weight percent based on the total solids content of the mixture. While not being desired to be limited by theory, it is believed that the conversion may permit the formation of a fluorogallium phthalocyanine of a different crystal form, and which form may possess a high photosensitivity.

The fluorogallium phthalocyanine, which can be identified by a number of know methods, such as its XRPD and its IR spectra values/peaks, which in order of strongest to weakest for the XRPD evidenced peaks at Bragg angles 6.9, 23.3, 15.5, and 9.7 degrees; with the IR, in the form of wavenumber (absorbance, with w=weak, m=medium, and s=strong), ν equal to 3,047(w), 1,614(w), 1,498(m), 1,421(m), 1,346(m), 1,335(m), 1,288(m), 1,122(s), 1,090(m), 1,068(m), 876(m), 756(m), and 721(s) cm$^{-1}$. Subsequent preparations of the fluorogallium phthalocyanine, by repeating the above process, exhibited the same XRPD and IR spectra as recited immediately above.

The fluorogallium phthalocyanine may be represented by, for example, the following, or in embodiments, it is believed, mixtures thereof wherein n represents the number of units of, for example, from about 50 to about 5,000, and more specifically, from about 100 to about 2,000. However, it is believed that the fluorogallium phthalocyanine of the formulas/structures below is, in embodiments, the product formed subsequent to the conversion process.

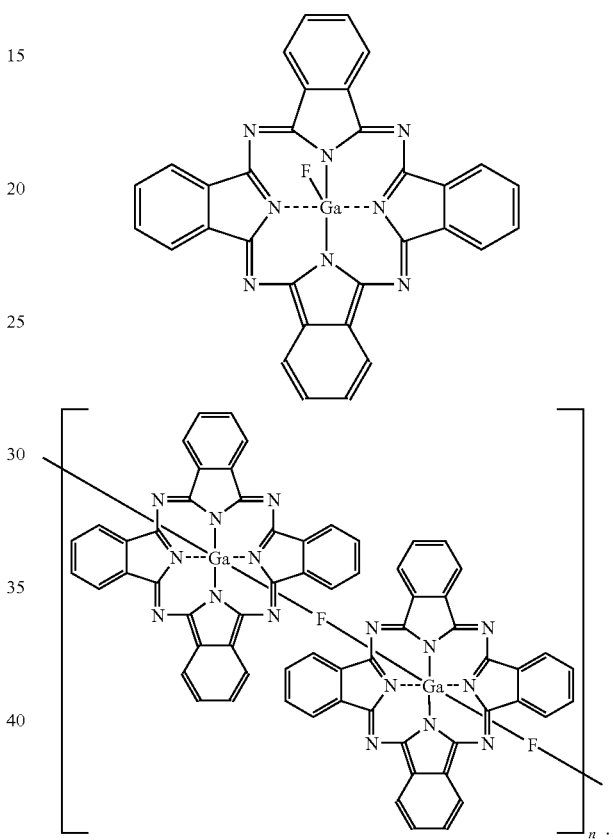

The thickness of the photoconductor substrate layer depends on a number of factors, including economical considerations, electrical characteristics, and the like, thus this layer may be of a thickness, for example, of over 3,000 microns, such as from about 1,000 to about 3,000 microns, from about 1,000 to about 2,000 microns, from about 500 to about 1,200 microns, or from about 300 to about 700 microns, or of a minimum thickness. In embodiments, the thickness of this layer is from about 75 microns to about 300 microns, or from about 100 to about 150 microns.

The substrate may be opaque or substantially transparent, and may comprise any suitable material that functions as a supporting layer for the hole blocking, adhesive, photogenerating, and charge transport layers, and which substrate should possess the appropriate mechanical properties. Accordingly, the substrate may comprise a layer of an electrically nonconductive or conductive material such as an inorganic or an organic composition. As electrically nonconducting materials, there may be employed various resins known for this purpose including polyesters, polycarbonates, polyamides, polyurethanes, and the like, which are flexible as thin webs. An electrically conducting substrate may be any suitable metal of, for example, aluminum, nickel, steel, copper, and the like, or a polymeric material, as described above, filled with an electrically conducting substance, such as carbon, metallic powder, and the like, or an organic electrically conducting material. The electrically insulating or conductive substrate may be in the form of an endless flexible belt, a web, a rigid cylinder, a sheet, and the like. The thickness of the substrate layer depends on numerous factors, including strength desired and economical considerations. For a drum photoconductor, this layer may be of substantial thickness of, for example, up to many centimeters or of a minimum thickness of less than a millimeter. Similarly, a flexible belt may be of a substantial thickness of, for example, about 250 micrometers, or of a minimum thickness of equal to or less than about 50 micrometers, such as from about 5 to about 45, from about 10 to about 40, from about 1 to about 25, or from about 3 to about 45 micrometers. In embodiments where the substrate layer is not conductive, the surface thereof may be rendered electrically conductive by an electrically conductive coating. The conductive coating may vary in thickness over substantially wide ranges depending upon the optical transparency, degree of flexibility desired, and economic factors.

Illustrative examples of substrates are as illustrated herein, and more specifically, layers selected for the imaging members of the present disclosure, and which substrates can be opaque or substantially transparent comprise a layer of insulating material including inorganic or organic polymeric materials, such as MYLAR® a commercially available polymer, MYLAR® containing titanium, a layer of an organic or inorganic material having a semiconductive surface layer, such as indium tin oxide, or aluminum arranged thereon, or a conductive material inclusive of aluminum, chromium, nickel, brass, or the like. The substrate may be flexible, seamless, or rigid, and may have a number of many different configurations, such as for example, a plate, a cylindrical drum, a scroll, an endless flexible belt, and the like. In embodiments, the substrate is in the form of a seamless flexible belt. In some situations, it may be desirable to coat on the back of the substrate, particularly when the substrate is a flexible organic polymeric material, an anticurl layer, such as for example, polycarbonate materials commercially available as MAKROLON®.

The photogenerating layer in embodiments can also include in addition to the fluorogallium phthalocyanine at least one other photogenerating pigment, such as metal phthalocyanines, metal free phthalocyanines, alkylhydroxyl gallium phthalocyanines, hydroxygallium phthalocyanines, chlorogallium phthalocyanines, perylenes, especially bis(benzimidazo)perylene, titanyl phthalocyanines, and the like, and more specifically, vanadyl phthalocyanines, Type V hydroxygallium phthalocyanines, and inorganic components such as selenium, selenium alloys, and trigonal selenium. Generally, the thickness of the photogenerating layer depends on a number of factors, including the thicknesses of the other layers, and the amount of photogenerating material contained in the photogenerating layer. Accordingly, this layer can be of a thickness as illustrated herein, and for example, from about 0.05 micron to about 10 microns, and more specifically, from about 0.25 micron to about 4 microns when, for example, the photogenerating compositions are present in an amount of from about 30 to about 75 percent by volume. The maximum thickness of this layer in embodiments is dependent primarily upon factors, such as photosensitivity, electrical properties and mechanical considerations.

Various suitable and conventional known processes may be used to mix, and thereafter, apply the photogenerating layer coating mixture like spraying, dip coating, roll coating, wire wound rod coating, vacuum sublimation, and the like. For some applications, the photogenerating layer may be fabricated in a dot or line pattern. Removal of the solvent of a solvent-coated layer may be effected by any known conventional techniques such as oven drying, infrared radiation drying, air drying, and the like.

The coating of the photogenerating layer in embodiments of the present disclosure can be accomplished such that the final dry thickness of the photogenerating layer is as illustrated herein, and can be, for example, from about 0.01 to about 30 microns after being dried at, for example, about 40° C. to about 150° C. for about 1 to about 90 minutes. More specifically, a photogenerating layer of a thickness, for example, of from about 0.1 to about 30, or from about 0.2 to about 5 microns can be applied to or deposited on the substrate, on other surfaces in between the substrate and the charge transport layer, and the like.

For the deposition of the photogenerating layer, it is desirable to select a coating solvent that may not substantially disturb or adversely affect the other previously coated layers of the device. Examples of coating solvents for the photogenerating layer are ketones, alcohols, aromatic hydrocarbons, halogenated aliphatic hydrocarbons, ethers, amines, amides, esters, and the like. Specific solvent examples are cyclohexanone, acetone, methyl ethyl ketone, methanol, ethanol, butanol, amyl alcohol, toluene, xylene, chlorobenzene, carbon tetrachloride, chloroform, methylene chloride, trichloroethylene, tetrahydrofuran, dioxane, diethyl ether, dimethyl formamide, dimethyl acetamide, butyl acetate, ethyl acetate, methoxyethyl acetate, and the like.

In embodiments, a suitable known adhesive layer can be included in the photoconductor. Typical adhesive layer materials include, for example, polyesters, polyurethanes, and the like. The adhesive layer thickness can vary and in embodiments is, for example, from about 0.05 micrometer (500 Angstroms) to about 0.3 micrometer (3,000 Angstroms). The adhesive layer can be deposited on the hole blocking layer by spraying, dip coating, roll coating, wire wound rod coating, gravure coating, Bird applicator coating, and the like. Drying of the deposited coating may be effected by, for example, oven drying, infrared radiation drying, air drying and the like.

As adhesive layers usually in contact with or situated between the hole blocking layer and the photogenerating layer, there can be selected various known substances inclusive of copolyesters, polyamides, poly(vinyl butyral), poly(vinyl alcohol), polyurethane, and polyacrylonitrile. This layer is, for example, of a thickness of from about 0.001 micron to about 1 micron, or from about 0.1 to about 0.5 micron. Optionally, this layer may contain effective suitable amounts, for example from about 1 to about 10 weight percent, of conductive and nonconductive particles, such as zinc oxide, titanium dioxide, silicon nitride, carbon black, and the like, to provide, for example, in embodiments of the present disclosure, further desirable electrical and optical properties.

A number of suitable known charge transport components, molecules, or compounds can be selected for the charge transport layer, which layer is generally of a thickness of from about 5 microns to about 90 microns, and more specifically, of a thickness of from about 10 microns to about 40 microns, such as aryl amines, of the following formula/structure

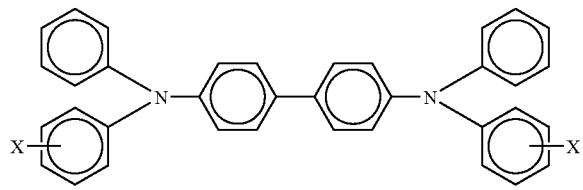

wherein X, which X may also be contained on each of the four terminating rings, is a suitable hydrocarbon, such as alkyl, alkoxy, aryl, derivatives thereof, or mixtures thereof; and a halogen, or mixtures of the hydrocarbon and halogen, and especially those substituents selected from the group consisting of Cl and $CH_3$; and molecules of the following formula

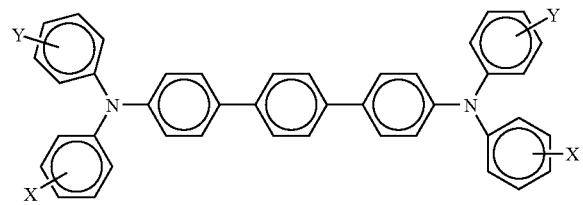

wherein X and Y are independently alkyl, alkoxy, aryl, a halogen, or mixtures thereof.

Alkyl and alkoxy contain, for example, from 1 to about 25 carbon atoms, and more specifically, from 1 to about 12 carbon atoms, such as methyl, ethyl, propyl, butyl, pentyl, and the corresponding alkoxides. Aryl can contain from 6 to about 36 carbon atoms, such as phenyl, and the like. Halogen includes chloride, bromide, iodide and fluoride. Substituted alkyls, alkoxys, and aryls can also be selected in embodiments.

Examples of specific aryl amines present in an amount of from about 20 to about 90 weight percent include N,N'-diphenyl-N,N'-bis(alkylphenyl)-1,1-biphenyl-4,4'-diamine wherein alkyl is selected from the group consisting of methyl, ethyl, propyl, butyl, hexyl, and the like; N,N'-diphenyl-N,N'-bis(halophenyl)-1,1'-biphenyl-4,4'-diamine wherein the halo substituent is a chloro substituent; N,N'-bis(4-butylphenyl)-N,N'-di-p-tolyl-[p-terphenyl]-4,4"-diamine, N,N'-bis(4-butylphenyl)-N,N'-di-m-tolyl-[p-terphenyl]-4,4"-diamine, N,N'-bis(4-butylphenyl)-N,N'-di-o-tolyl-[p-terphenyl]-4,4"-diamine, N,N'-bis(4-butylphenyl)-N,N'-bis-(4-isopropylphenyl)-[p-terphenyl]-4,4"-diamine, N,N'-bis(4-butylphenyl)-N,N'-bis-(2-ethyl-6-methylphenyl)-[p-terphenyl]-4,4"-diamine, N,N'-bis(4-butylphenyl)-N,N'-bis-(2,5-dimethylphenyl)-[p-terphenyl]-4,4'-diamine, N,N'-diphenyl-N,N'-bis(3-chlorophenyl)-[p-terphenyl]-4,4"-diamine, and the like. Other known charge transport layer molecules can be selected, reference for example, U.S. Pat. Nos. 4,921,773 and 4,464,450, the disclosures of which are totally incorporated herein by reference.

Examples of the binder materials selected for the photogenerating layer and charge transport layers include components, such as those described in U.S. Pat. No. 3,121,006, the disclosure of which is totally incorporated herein by reference. Specific examples of polymer binder materials include polycarbonates, polyarylates, acrylate polymers, vinyl polymers, cellulose polymers, polyesters, polysiloxanes, polyamides, polyurethanes, poly(cyclo olefins), epoxies, and random or alternating copolymers thereof; and more specifically, polycarbonates such as poly(4,4'-isopropylidene-diphenylene)carbonate (also referred to as bisphenol-A-polycarbonate), poly(4,4'-cyclohexylidinediphenylene)carbonate (also referred to as bisphenol-Z-polycarbonate), poly(4,4'-isopropylidene-3,3'-dimethyl-diphenyl) carbonate (also referred to as bisphenol-C-polycarbonate), and the like. In embodiments, electrically inactive binders are comprised of polycarbonate resins with a molecular weight of from about 20,000 to about 100,000, or with a molecular weight $M_w$ of from about 50,000 to about 100,000 preferred. Generally, the transport layer contains from about 10 to about 75 percent by weight of the charge transport material, and more specifically, from about 35 percent to about 50 percent of this material.

The charge transport layer or layers, and more specifically, a first charge transport in contact with the photogenerating layer, and thereover a top or second charge transport overcoating layer may comprise charge transporting small molecules dissolved or molecularly dispersed in a film forming electrically inert polymer such as a polycarbonate. In embodiments, "dissolved" refers, for example, to forming a solution in which the small molecule is dissolved in the polymer to form a homogeneous phase; and "molecularly dispersed in embodiments" refers, for example, to charge transporting molecules dispersed in the polymer, the small molecules being dispersed in the polymer on a molecular scale. Various charge transporting or electrically active small molecules may be selected for the charge transport layer or layers. In embodiments, "charge transport" refers, for example, to charge transporting molecules as a monomer that allows the free charge generated in the photogenerating layer to be transported across the transport layer.

Examples of hole transporting molecules, especially for the first and second charge transport layers, and present in an amount of from about 40 to about 90 weight percent, include, for example, pyrazolines such as 1-phenyl-3-(4"-diethylamino styryl)-5-(4"-diethylamino phenyl)pyrazoline; aryl amines such as N,N'-diphenyl-N,N'-bis(3-methylphenyl)-(1, 1'-biphenyl)-4,4'-diamine, N,N'-bis(4-butylphenyl)-N,N'-di-p-tolyl-[p-terphenyl]-4,4"-diamine, N,N'-bis(4-butylphenyl)-N,N'-di-m-tolyl-[p-terphenyl]-4,4"-diamine, N,N'-bis(4-butylphenyl)-N,N'-di-o-tolyl-[p-terphenyl]-4,4"-diamine, N,N'-bis(4-butylphenyl)-N,N'-bis-(4-isopropylphenyl)-[p-terphenyl]-4,4"-diamine, N,N'-bis(4-butylphenyl)-N,N'-bis-(2-ethyl-6-methylphenyl)-[p-terphenyl]-4,4"-diamine, N,N'-bis(4-butylphenyl)-N,N'-bis-(2,5-dimethylphenyl)-[p-terphenyl]-4,4"-diamine, N,N'-diphenyl-N,N'-bis(3-chlorophenyl)-[p-terphenyl]-4,4"-diamine; hydrazones such as N-phenyl-N-methyl-3-(9-ethyl)carbazyl hydrazone and 4-diethyl amino benzaldehyde-1,2-diphenyl hydrazone; and oxadiazoles such as 2,5-bis(4-N,N'-diethylaminophenyl)-1, 2,4-oxadiazole, stilbenes, and the like. However, in embodiments, to minimize or avoid cycle-up in equipment, such as printers, with high throughput, the charge transport layer should be substantially free (less than about two percent) of di or triamino-triphenyl methane. A small molecule charge transporting compound that permits injection of holes into the photogenerating layer with high efficiency and transports them across the charge transport layer with short transit times includes N,N'-diphenyl-N,N'-bis(3-methylphenyl)-(1,1'-biphenyl)-4,4'-diamine, N,N'-bis(4-butylphenyl)-N,N'-di-p-tolyl-[p-terphenyl]-4,4"-diamine, N,N'-bis(4-butylphenyl)-N,N'-di-m-tolyl-[p-terphenyl]-4,4"-diamine, N,N'-bis(4-butylphenyl)-N,N'-di-o-tolyl-[p-terphenyl]-4,4"-diamine, N,N'-bis(4-butylphenyl)-N,N'-bis-(4-isopropylphenyl)-[p- terphenyl]-4,4"-diamine, N,N'-bis(4-butylphenyl)-N,N'-bis-(2-ethyl-6-methylphenyl)-[p-terphenyl]-4,4"-diamine, N,N'-bis(4-butylphenyl)-N,N'-bis-(2,5-dimethylphenyl)-[p-terphenyl]-4,4"-diamine, and N,N'-diphenyl-N,N'-bis(3-chlorophenyl)-[p-terphenyl]-4,4"-diamine, or mixtures thereof. If desired, the charge transport material in the charge transport layer may comprise a polymeric charge transport material or a combination of a small molecule charge transport material and a polymeric charge transport material.

A number of processes may be used to mix, and thereafter apply the charge transport layer or layers coating mixture to the photogenerating layer. Typical application techniques include spraying, dip coating, roll coating, wire wound rod coating, and the like. Drying of the charge transport deposited coating may be effected by any suitable conventional technique such as oven drying, infrared radiation drying, air drying, and the like.

The thickness of each of the charge transport layers in embodiments is from about 10 to about 70 micrometers, but thicknesses outside this range may, in embodiments, also be selected. The charge transport layer should be an insulator to the extent that an electrostatic charge placed on the hole transport layer is not conducted in the absence of illumination at a rate sufficient to prevent formation and retention of an electrostatic latent image thereon. In general, the ratio of the thickness of the charge transport layer to the photogenerating layer can be from about 2:1 to 200:1, and in some instances 400:1. The charge transport layer is substantially nonabsorbing to visible light or radiation in the region of intended use, but is electrically "active" in that it allows the injection of photogenerated holes from the photoconductive layer, or photogenerating layer, and allows these holes to be transported through itself to selectively discharge a surface charge on the surface of the active layer.

The thickness of the continuous charge transport overcoat layer selected depends upon the abrasiveness of the charging (bias charging roll), cleaning (blade or web), development (brush), transfer (bias transfer roll), and the like in the system employed, and can be up to about 10 microns. In embodiments, this thickness for each layer is from about 1 micron to about 5 microns. Various suitable and conventional methods may be used to mix, and thereafter apply the charge transport layer and an overcoat layer coating mixture to the photogenerating layer. Typical application techniques include spraying, dip coating, roll coating, wire wound rod coating, and the like. Drying of the deposited coating may be effected by any suitable conventional technique, such as oven drying, infrared radiation drying, air drying, and the like. The dried overcoating layer of this disclosure can in embodiments transport holes during imaging, and should not have too high a free carrier concentration. Free carrier concentration in the overcoat increases the dark decay. Examples of overcoatings, such as PASCO, are illustrated in copending applications, the disclosures of which are totally incorporated herein by reference.

The optional hole blocking or undercoat layer for the imaging members or photoconductors of the present disclosure can contain a number of components as illustrated herein, including known hole blocking components, such as amino silanes, doped metal oxides, TiSi, a metal oxide like titanium, chromium, zinc, tin, and the like; a mixture of phenolic compounds and a phenolic resin, or a mixture of two phenolic resins; and optionally a dopant such as $SiO_2$. The phenolic compounds usually contain at least two phenol groups, such as bisphenol A (4,4'-isopropylidenediphenol), E (4,4'-ethylidenebisphenol), F (bis(4-hydroxyphenyl)methane), M (4,4'-(1,3-phenylenediisopropylidene)bisphenol), P (4,4'-(1,4-phenylenediisopropylidene) bisphenol), S (4,4'-sulfonyldiphenol), Z (4,4'-cyclohexylidenebisphenol); hexafluorobisphenol A (4,4'-(hexafluoro isopropylidene)diphenol), resorcinol, hydroxyquinone, catechin, and the like.

The hole blocking layer can be, for example, comprised of from about 20 weight percent to about 80 weight percent, and more specifically, from about 55 weight percent to about 65 weight percent of suitable component like a metal oxide, such as $TiO_2$, from about 20 weight percent to about 70 weight percent, and more specifically, from about 25 weight percent to about 50 weight percent of a phenolic resin; from about 2 weight percent to about 20 weight percent, and more specifically, from about 5 weight percent to about 15 weight percent of a phenolic compound preferably containing at least two phenolic groups, such as bisphenol S, and from about 2 weight percent to about 15 weight percent, and more specifically, from about 4 weight percent to about 10 weight percent of a plywood suppression dopant, such as $SiO_2$. The hole blocking layer coating dispersion can, for example, be prepared as follows. The metal oxide/phenolic resin dispersion is first prepared by ball milling or dynomilling until the median particle size of the metal oxide in the dispersion is less than about 10 nanometers, for example from about 5 to about 9 nanometers. To the above dispersion, a phenolic compound and dopant are added followed by mixing. The hole blocking layer coating dispersion can be applied by dip coating or web coating, and the layer can be thermally cured after coating. The hole blocking layer resulting is, for example, of a thickness of from about 0.01 micron to about 30 microns, and more specifically, from about 0.1 micron to about 8 microns. Examples of phenolic resins include formaldehyde polymers with phenol, p-tert-butylphenol, cresol, such as VARCUM® 29159 and 29101 (available from OxyChem Company), and DURITE® 97 (available from Borden Chemical), formaldehyde polymers with ammonia, cresol and phenol, such as VARCUM® 29112 (available from OxyChem Company), formaldehyde polymers with 4,4'-(1-methylethylidene) bisphenol, such as VARCUM™ 29108 and 29116 (available from OxyChem Company), formaldehyde polymers with cresol and phenol, such as VARCUM® 29457 (available from OxyChem Company), DURITE® SD-423A, SD-422A (available from Borden Chemical), or formaldehyde polymers with phenol and p-tert-butylphenol, such as DURITE® ESD 556C (available from Borden Chemical).

The optional hole blocking layer may be applied to the substrate. Any suitable and conventional blocking layer capable of forming an electronic barrier to holes between the adjacent photoconductive layer (or electrophotographic imaging layer) and the underlying conductive surface of the substrate may be selected.

Hole blocking layer components can comprise an aminosilane such as 3-aminopropyl triethoxysilane, N,N-dimethyl-3-aminopropyl triethoxysilane, N-phenylaminopropyl trimethoxysilane, triethoxysilylpropylethylene diamine, trimethoxysilylpropylethylene diamine, trimethoxysilylpropyldiethylene triamine, N-aminoethyl-3-aminopropyl trimethoxysilane, N-2-aminoethyl-3-aminopropyl trimethoxysilane, N-2-aminoethyl-3-aminopropyl tris(ethylethoxy) silane, p-aminophenyl trimethoxysilane, N,N'-dimethyl-3-aminopropyl triethoxysilane, 3-aminopropylmethyl diethoxysilane, 3-aminopropyl trimethoxysilane, N-methylaminopropyl triethoxysilane, methyl[2-(3-trimethoxysilylpropylamino) ethylamino]-3-proprionate, (N,N'-dimethyl-3-amino)propyl triethoxysilane, N,N-dimethylaminophenyl triethoxysilane, trimethoxysilylpropyldiethylene triamine, and the like, and mixtures thereof. Specific aminosilane materials are 3-aminopropyl triethoxysilane (γ-APS), N-aminoethyl-3-aminopropyl trimethoxysilane, (N,N'-dimethyl-3-amino)propyl triethoxysilane, and mixtures thereof.

Examples of components or materials optionally incorporated into the charge transport layers or at least one charge transport layer to, for example, enable improved lateral charge migration (LCM) resistance include hindered phenolic antioxidants, such as tetrakis methylene(3,5-di-tert-butyl-4-hydroxy hydrocinnamate) methane (IRGANOX™ 1010, available from Ciba Specialty Chemical), butylated hydroxytoluene (BHT), and other hindered phenolic antioxidants including SUMILIZER™ BHT-R, MDP-S, BBM-S, WX-R, NW, BP-76, BP-101, GA-80, GM and GS (available from Sumitomo Chemical Co., Ltd.), IRGANOX™ 1035, 1076, 1098, 1135, 1141, 1222, 1330, 1425WL, 1520L, 245, 259, 3114, 3790, 5057 and 565 (available from Ciba Specialties Chemicals), and ADEKA™ STAB AO-20, AO-30, AO-40, AO-50, AO-60, AO-70, AO-80 and AO-330 (available from Asahi Denka Co., Ltd.); hindered amine antioxidants such as SANOL™ LS-2626, LS-765, LS-770 and LS-744 (available from SNKYO CO., Ltd.), TINUVIN™ 144 and 622LD (available from Ciba Specialties Chemicals), MARK™ LA57, LA67, LA62, LA68 and LA63 (available from Asahi Denka Co., Ltd.), and SUMILIZER™ TPS (available from Sumitomo Chemical Co., Ltd.); thioether antioxidants such as SUMILIZER™ TP-D (available from Sumitomo Chemical Co., Ltd); phosphite antioxidants such as MARK™ 2112, PEP-8, PEP-24G, PEP-36, 329K and HP-10 (available from Asahi Denka Co., Ltd.); other molecules such as bis(4-diethylamino-2-methylphenyl) phenylmethane (BDETPM), bis-[2-methyl-4-(N-2-hydroxyethyl-N-ethyl-aminophenyl)]-phenylmethane (DHTPM), and the like. The weight percent of the antioxidant in at least one of the charge transport layers is from about 0 to about 20, from about 1 to about 10, or from about 3 to about 8 weight percent.

Primarily for purposes of brevity, the examples of each of the substituents, and each of the components/compounds/molecules, polymers, (components) for each of the layers specifically disclosed herein are not intended to be exhaustive. Thus, a number of suitable components, polymers, formulas, structures, and R groups or substituent examples and carbon chain lengths not specifically disclosed or claimed are intended to be encompassed by the present disclosure and claims. For example, these substituents include suitable known groups, such as aliphatic and aromatic hydrocarbons with various carbon chain lengths, and which hydrocarbons can be substituted with a number of suitable known groups, and mixtures thereof. Also, the carbon chain lengths are intended to include all numbers between those disclosed or claimed or envisioned, thus from 1 to about 12 carbon atoms includes 1, 2, 3, 4, 5, 6, 7, 8, 9, 10, 11, and 12, up to 25, or more. Similarly, the thickness of each of the layers, the examples of components in each of the layers, the amount ranges of each of the components disclosed and claimed is not exhaustive, and it is intended that the present disclosure and claims encompass other suitable parameters not disclosed, or that may be envisioned.

The following Examples are being submitted to illustrate embodiments of the present disclosure. These Examples are intended to be illustrative only, and are not intended to limit the scope of the present disclosure. Also, parts and percentages are by weight unless otherwise indicated.

COMPARATIVE EXAMPLE 1

A photoconductor was prepared by providing a 0.02 micron thick titanium layer coated (the coater device) on a biaxially oriented polyethylene naphthalate substrate (KALEDEX™ 2000) having a thickness of 3.5 mils, and applying thereon, with a gravure applicator, a hole blocking layer solution containing 50 grams of 3-aminopropyl triethoxysilane (γ-APS), 41.2 grams of water, 15 grams of acetic acid, 684.8 grams of denatured alcohol, and 200 grams of heptane. This layer was then dried for about 1 minute at 120° C. in the forced air dryer of the coater. The resulting hole blocking layer had a dry thickness of 500 Angstroms. An adhesive layer was then prepared by applying a wet coating over the blocking layer, using a gravure applicator, and which adhesive contained 0.2 percent by weight based on the total weight of the solution of copolyester adhesive (ARDEL D100™ available from Toyota Hsutsu Inc.) in a 60:30:10 volume ratio mixture of tetrahydrofuran/monochlorobenzene/methylene chloride. The adhesive layer was then dried for about 1 minute at 120° C. in the forced air dryer of the coater. The resulting adhesive layer had a dry thickness of 200 Angstroms.

A photogenerating layer dispersion was prepared by introducing 0.45 gram of the known polycarbonate IUPILON 200™ (PCZ-200) weight average molecular weight of 20,000, available from Mitsubishi Gas Chemical Corporation, and 50 milliliters of tetrahydrofuran into a 4 ounce glass bottle. To this solution were added 2.4 grams of hydroxygallium phthalocyanine (Type V), and 300 grams of ⅛ inch (3.2 millimeters) diameter stainless steel shot. This mixture was then placed on a ball mill for 8 hours. Subsequently, 2.25 grams of PCZ-200 were dissolved in 46.1 grams of tetrahydrofuran, and added to the hydroxygallium phthalocyanine dispersion. This slurry was then placed on a shaker for 10 minutes. The resulting dispersion was, thereafter, applied to the above adhesive interface with a Bird applicator to form a photogenerating layer having a wet thickness of 0.25 mil. A strip about 10 millimeters wide along one edge, of the substrate web bearing the blocking layer and the adhesive layer was deliberately left uncoated by any of the photogenerating layer material to facilitate adequate electrical contact by the ground strip layer that was applied later. The photogenerating layer was dried at 120° C. for 1 minute in a forced air oven to form a dry photogenerating layer having a thickness of 0.4 micron.

The resulting photogenerating layer was overcoated with a charge transport layer by introducing into an amber glass bottle in a weight ratio of 1:1 N,N'-diphenyl-N,N'-bis(3-methylphenyl)-1,1'-biphenyl-4,4'-diamine, and MAKROLON® 5705, a known polycarbonate resin having a molecular weight average of from about 50,000 to about 100,000, commercially available from Farbenfabriken Bayer A.G. The resulting mixture was then dissolved in methylene chloride to form a solution containing 15 percent by weight solids. This solution was applied on the photogenerating layer to form the charge transport layer coating that upon drying (120° C. for 1 minute) had a thickness of 29 microns. During this coating process, the humidity was equal to or less than 15 percent.

EXAMPLE I

Fluorogallium Phthalocyanine was Prepared as Follows:

To 3 grams of hydroxygallium phthalocyanine (Type I), 50 milliliters of a 48 percent hydrofluoric acid solution were added. The mixture resulting was then placed in a water bath which was heated to a boil, about 100° C. The water was replenished as needed, and after about 6 to 7 hours, the water (from the aqueous hydrofluoric acid solution) and unreacted hydrogen fluoride had evaporated off leaving only a purple solid. This procedure was repeated the next day. Subsequently, the resulting purple solid was transferred to a fritted vacuum funnel wherein the solid was washed with deionized water (2×50 milliliters), methanol (50 milliliters), and acetone (50 milliliters). The purple product was then dried in a vacuum oven at 60° C. overnight, about 18 to about 20 hours. The product was identified as fluorogallium phthalocyanine by x-ray photoelectron spectroscopy, and by x-ray diffraction, and infrared spectroscopy. Final yield: 2.85 grams (95 percent).

The x-ray powder diffraction pattern illustrated strong peaks at Bragg angles (2Θ) of 6.9, 23.3, and 15.5 degrees; and IR: ν=3,047(w), 1,614(w), 1,498(m), 1,421(m), 1,346(m), 1,335(m), 1,288(m), 1,122(s), 1,090(m), 1,068(m), 876(m), 756(m), 721(s) cm$^{-1}$.

| | Results of the Quantitative XPS Analyses (Presented in Units of Atomic Percent) | | | | |
|---|---|---|---|---|---|
| | At percent C | At percent N | At percent O | At percent F | At percent Ga |
| Actual | 77.4 | 17.2 | 0.7 | 2.3 | 2.4 |
| Expected | 76.2 | 19.0 | 0 | 2.4 | 2.4 |

The infrared spectroscopy was conducted as follows. Samples were removed with a scalpel, then placed on a diamond anvil cell and flattened. Transmission Fourier Transform Infrared (FTIR) spectra were collected on a Nicolet 670 FTIR bench equipped with a Nic-Plan microscope accessory.

X-ray diffraction data are based on data measured by x-ray diffractometry using CuKα characteristic x-rays according to the following conditions:
  Apparatus: Siemens D5000 X-ray Powder Diffractometer
  X-ray tube (Target): Cu (wavelength=1.5418 angstroms)
  Tube voltage: 40 kV
  Tube current: 30 mA
  Scanning method: 2Θ/Θ step scan
  Counting Time per Step: 2 seconds
  Sampling interval: 0.010 degrees
  Starting angle (2Θ): 5 degrees
  Stopping angle (2Θ): 33 degrees
  Divergence slit: 2 millimeters
  Scattering slit: 2 millimeters
  Receiving slit: 0.2 millimeter
  Curved graphite monochromator used
  Pulse-height discrimination employed.

The x-ray photoelectron spectroscopy was conducted as follows. The powdered pigment was presented to the x-ray source by depositing the powder onto double-backed conductive copper adhesive tape adhered to a stainless steel sample holder. A region about 1 millimeter in diameter was analyzed.

The above process was repeated except that there were selected 7 grams of the hydroxygallium phthalocyanine Type I resulting in the fluorogallium phthalocyanine in a yield of 94 percent, and with a substantially identical XRPD and IR spectra.

Conversion of Fluorogallium Phthalocyanine:

The above washed and vacuum-dried fluorogallium phthalocyanine product was subjected to a series of separate conversions with solvents of dimethylformamide (DMF), n-butyl acetate (NBA), monochlorobenzene (MCB), deionized water, methanol, tetrahydrofuran (THF), and acetonitrile respectively. Specifically, the fluorogallium phthalocyanine product pigment, 1 gram, was placed in a 60 milliliter amber glass jar together with 30 grams of 6 millimeter glass beads and 20 grams of the conversion solvent. The resulting mixture was then placed on the roll mill operating at a speed of approximately 60 rpm for 48 hours. The product was then collected through filtration using a fritted vacuum funnel, and washed with acetone (2×30 milliliters), followed by drying in a vacuum oven overnight, about 18 to 20 hours.

EXAMPLE II

A photoconductor was prepared by repeating the process of Comparative Example 1 except that there was selected in place of the hydroxygallium phthalocyanine, 0.56 gram of the fluorogallium phthalocyanine pigment obtained by the process of Example I, and which pigment was added to a solution of 0.56 gram of the above PCZ-200 polycarbonate binder and 12.88 grams of tetrahydrofuran solvent, followed by milling the dispersion for 16 hours at 200 rpm. Subsequently, 6.36 grams of tetrahyrdofuran were added to generate a 5.5 solids coating dispersion. Thereafter, the resulting solution was applied to the above substrate with a Bird applicator bar (0.00025 inch) to form a photogenerating layer. After drying at 120° C. for 1 minute, the photogenerating layer dry thickness was about 0.5 μm.

EXAMPLE III

A photoconductor was prepared by repeating the process of Example II except that there was selected 1 gram of the fluorogallium phthalocyanine. After drying at 120° C. for 1 minute, a dry thickness of about 1 μm was obtained.

Electrical Property Testing

The above prepared photoconductors of Comparative Example 1 and Example II were tested in a scanner set to obtain photoinduced discharge cycles, sequenced at one charge-erase cycle, followed by one charge-expose-erase cycle, wherein the light intensity was incrementally increased with cycling to produce a series of photoinduced discharge characteristic (PIDC) curves from which the photosensitivity and surface potentials at various exposure intensities were measured. Additional electrical characteristics were obtained by a series of charge-erase cycles with incrementing surface potential to generate several voltage versus charge density curves. The scanner was equipped with a scorotron set to a constant voltage charging at various surface potentials. The photoconductors were tested at surface potentials of 500 volts with the exposure light intensity incrementally increased by means of regulating a series of neutral density filters; the exposure light source was a 780 nanometer light emitting diode. The xerographic simulation was completed in an environmentally controlled light tight chamber at ambient conditions (40 percent relative humidity and 22° C.).

The $E_{1/2}$ values for the photoconductors containing the fluorogallium phthalocyanine, and various conversion solvents are indicated in the following Table. The $E_{1/2}$ for the Comparative Example 1 photoconductor were about 0.8 to 1 ergs/cm$^2$.

TABLE

| | Conversion Solvent | | | | | | | |
|---|---|---|---|---|---|---|---|---|
| | None | DMF | NBA | MCB | H$_2$O | Methanol | THF | Acetonitrile |
| $E_{1/2}$ (ergs/cm$^2$) | 6.2 | 5.7 | 6.7 | 2.9 | 3.3 | 8.5 | 3.9 | 3.4 |

Figure 2:
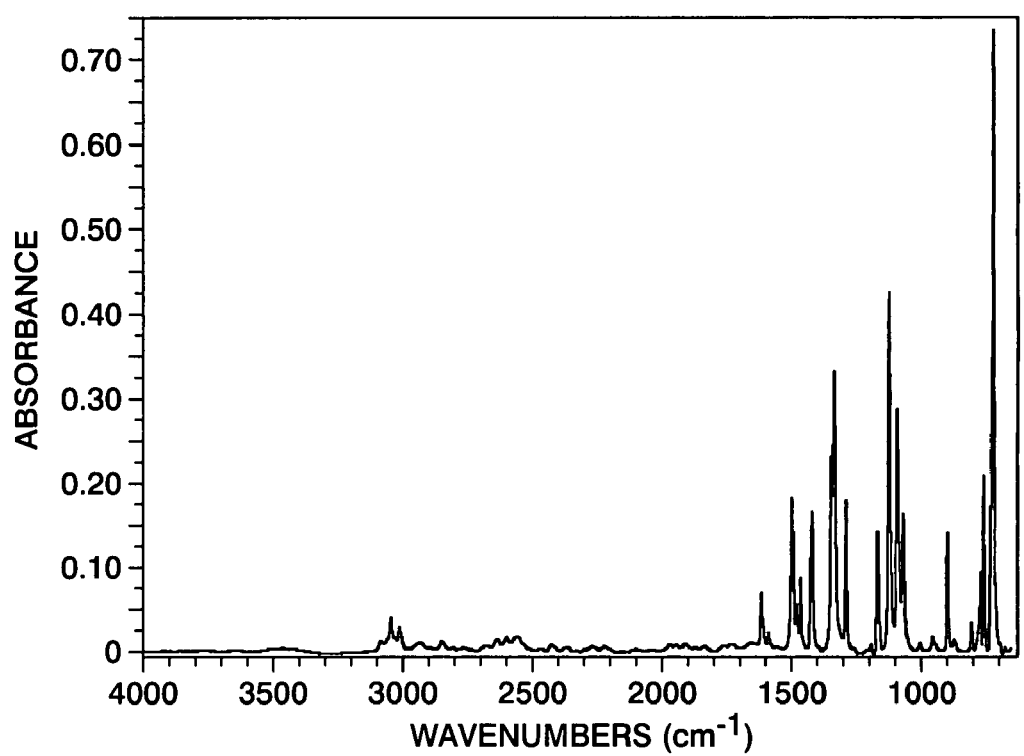
FIG. 2 illustrates an infrared spectrum of fluorogallium phthalocyanine.

Illustrated in FIG. 1 is the fluorogallium phthalocyanine XRPD with major measured peaks at 6.9, 23.3, and 15.5 degrees, and in FIG. 2 is the fluorogallium phthalocyanine IR spectra with major peaks at 721, 1,122, and 1,335 cm$^{-1}$.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. A flexible photoconductor comprising in sequence a supporting substrate layer, a photogenerating layer, and a charge transport layer, and wherein said photogenerating layer includes a fluorogallium phthalocyanine in an amount of from about 75 to about 100 weight percent, wherein said fluorogallium phthalocyanine is represented by

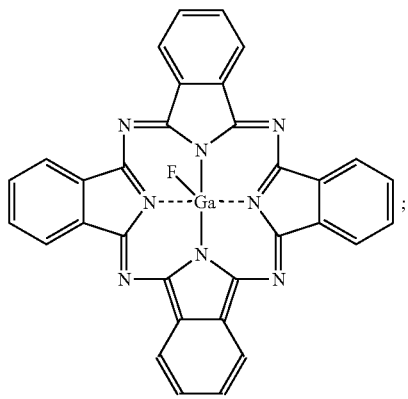

wherein said charge transport layer is comprised of at least one of

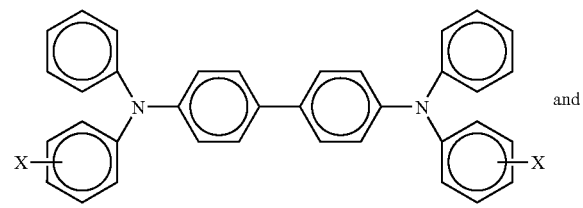

and

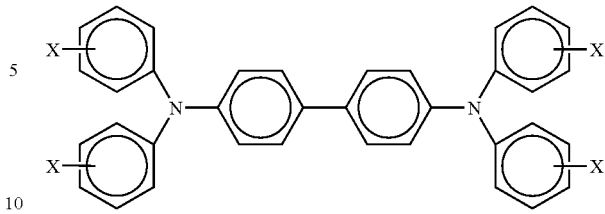

wherein X is selected from the group consisting of at least one of alkyl, alkoxy, aryl, halogen, and mixtures thereof; and wherein said fluorogallium phthalocyanine possesses XRPD major peaks at 6.9, 23.3, and 15.5 degrees, and IR spectra major peaks at 721, 1,122, and 1,335 $cm^{-1}$.

2. A photoconductor in accordance with claim 1 wherein said amount is from about 80 to about 95 percent by weight.

3. A photoconductor in accordance with claim 1 further including a hole blocking layer and an adhesive layer, which blocking layer is situated between said substrate and said adhesive layer.

4. A photoconductor in accordance with claim 1 wherein said substrate is comprised of a conductive material.

5. A photoconductor in accordance with claim 1 wherein said substrate is comprised of an insulating material.

6. A photoconductor in accordance with claim 1 wherein said substrate is comprised of a polymer.

7. A photoconductor in accordance with claim 1 wherein said substrate is comprised of aluminum.

8. A photoconductor in accordance with claim 1 wherein said photogenerating layer further contains a resin binder.

9. A photoconductor in accordance with claim 1 wherein said charge transport layer further contains a resin binder.

10. A photoconductor in accordance with claim 1 wherein said charge transport is comprised of N,N'-diphenyl-N,N-bis (3-methylphenyl)-1,1'-biphenyl-4,4'-diamine.

11. A photoconductor in accordance with claim 1 wherein said charge transport layer contains an antioxidant comprised of a hindered phenol or a hindered amine.

* * * * *